US012799032B2

(12) United States Patent
Lai et al.

(10) Patent No.: US 12,799,032 B2
(45) Date of Patent: Nov. 17, 2026

(54) ENGINEERED STONE AND MANUFACTURING METHOD THEREOF

(71) Applicant: Queen Ceramic Incorporation, Taipei City (TW)

(72) Inventors: Cheng-Hsuan Lai, Taipei City (TW); Hsin-Pan Chu, Taipei City (TW); Wei-Min Chen, Taipei City (TW)

(73) Assignee: Queen Ceramic Incorporation, Taipei City (TW)

( * ) Notice: Subject to any disclaimer, the term of this patent is extended or adjusted under 35 U.S.C. 154(b) by 432 days.

(21) Appl. No.: 18/426,783

(22) Filed: Jan. 30, 2024

(65) Prior Publication Data

US 2025/0243111 A1 Jul. 31, 2025

(51) Int. Cl.

| | |
|---|---|
| ***C04B 14/22*** | (2006.01) |
| ***C04B 22/00*** | (2006.01) |
| ***C04B 26/18*** | (2006.01) |
| ***C04B 40/00*** | (2006.01) |
| ***C04B 41/72*** | (2006.01) |
| ***C04B 103/40*** | (2006.01) |

(52) U.S. Cl.

CPC .......... *C04B 14/22* (2013.01); *C04B 22/0066* (2013.01); *C04B 26/18* (2013.01); *C04B 40/0071* (2013.01); *C04B 40/0082* (2013.01); *C04B 41/72* (2013.01); *C04B 2103/408* (2013.01)

(58) Field of Classification Search

CPC ..... C04B 14/22; C04B 22/0066; C04B 26/18; C04B 40/0071; C04B 40/0082; C04B 41/72; C04B 2103/408; C04B 2111/54

See application file for complete search history.

(56) References Cited

U.S. PATENT DOCUMENTS

| | | | | |
|---|---|---|---|---|
| 4,678,819 A * | 7/1987 | Sasaki | C04B 26/04 | 524/789 |
| 8,999,199 B2 * | 4/2015 | Lee | C04B 26/18 | 252/301.36 |
| 2006/0138385 A1 * | 6/2006 | Yamanashi | B32B 9/04 | 252/301.36 |

FOREIGN PATENT DOCUMENTS

| | | | | |
|---|---|---|---|---|
| CN | 102775093 A | | 11/2012 | |
| CN | 106915921 A | * | 7/2017 | C04B 26/18 |
| CN | 109053028 A | * | 12/2018 | C04B 26/122 |
| CN | 109265068 B | | 9/2019 | |
| CN | 110524782 A | | 12/2019 | |
| CN | 111847987 A | | 10/2020 | |

* cited by examiner

*Primary Examiner* — Anthony J Green

(57) ABSTRACT

In the present disclosure, a manufacturing method of an engineered stone is provided. A raw material is provided, wherein the raw material includes 45.5-80% by weight of glass particle, 15.2-47% by weight of aluminium trihydrate (ATH), 6.5-18% by weight of resin, 0.07-0.28% by weight of curing agent, and 0.05-0.3% by weight of coupling agent. The raw material is mixed and stirred to form a stone intermediate. The stone intermediate is arranged in a mold, and the mold is removed. The stone intermediate is compressed under high pressure and vacuum to form a condensed stone intermediate, wherein the air in the stone intermediate is released. The condensed stone intermediate is cured at elevated temperature to form the engineered stone.

14 Claims, 3 Drawing Sheets

200

ENGINEERED STONE AND MANUFACTURING METHOD THEREOF

BACKGROUND

Field of Invention

The present disclosure relates to an engineered stone and a manufacturing method thereof. More particularly, the present disclosure relates to an engineered stone that is crystalline silica free.

Description of Related Art

With the rise of environmental awareness, in order to reduce the mining of natural stone, engineered stone has been developed. However, during the grinding or polishing process of the engineered stone, crystalline silica powder may easily produce. Crystalline silica powder may cause silicosis in technicians.

Accordingly, the present disclosure provides an engineered stone and a manufacturing method thereof, wherein the engineered stone does not contain crystalline silica.

SUMMARY

In accordance with an aspect of the present disclosure, an engineered stone is provided. The engineered stone includes 45.5-80% by weight of glass particle, 15.2-47% by weight of aluminium trihydrate (ATH), 6.5-18% by weight of resin, 0.07-0.28% by weight of curing agent, and 0.05-0.3% by weight of coupling agent.

According to some embodiments of the present disclosure, further includes 0.05-0.3% by weight of polymeric coupling agent.

According to some embodiments of the present disclosure, further includes 0.05-0.45% by weight of wetting dispersing agent.

According to some embodiments of the present disclosure, further includes 0.0002-0.8% by weight of pigment.

According to some embodiments of the present disclosure, wherein the glass particle includes 5-30% by weight of glass particle with an average particle size of 0.2-0.6 mm; 30-55% by weight of glass particle with an average particle size of 0.1-0.2 mm; 10-30% by weight of glass particle with an average particle size of 0.038-0.052 mm; and 0.5-15% by weight of glass particle with an average particle size of 0.011-0.019 mm.

According to some embodiments of the present disclosure, wherein the glass particle includes 15-35% by weight of ATH with an average particle size of 0.012-0.018 mm; and 0.2-12% by weight of ATH with an average particle size of 0.005-0.012 mm.

In accordance with an aspect of the present disclosure, a manufacturing method of an engineered stone is provided. A raw material is provided, wherein the raw material includes 45.5-80% by weight of glass particle, 15.2-47% by weight of aluminium trihydrate (ATH), 6.5-18% by weight of resin, 0.07-0.28% by weight of curing agent, and 0.05-0.3% by weight of coupling agent. The raw material is mixed and stirred to form a stone intermediate. The stone intermediate is arranged in a mold, and the mold is removed. The stone intermediate is compressed under high pressure and vacuum to form a condensed stone intermediate, wherein the air in the stone intermediate is released. The condensed stone intermediate is cured at elevated temperature to form the engineered stone.

According to some embodiments of the present disclosure, further including: performing a cutting process to the engineered stone; performing a flattening process to the engineered stone; and performing a polishing process to the engineered stone.

According to some embodiments of the present disclosure, wherein the resin includes unsaturated polyester.

According to some embodiments of the present disclosure, wherein the curing agent includes tert-butyl peroxy-2-ethylhexanoate.

According to some embodiments of the present disclosure, wherein the coupling agent includes 3-(trimethoxysilyl) propyl methacrylate.

According to some embodiments of the present disclosure, wherein the stone intermediate is compressed by a pressure of 100-140 tons.

According to some embodiments of the present disclosure, wherein the stone intermediate is compressed under 0.65 kPa.

According to some embodiments of the present disclosure, wherein the condensed stone intermediate is cured at 85° C. for 90 minutes.

According to some embodiments of the present disclosure, wherein the mold is made of poly(methyl methacrylate (PMMA), polypropylene (PP), polyvinyl chloride (PVC), or stainless steel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
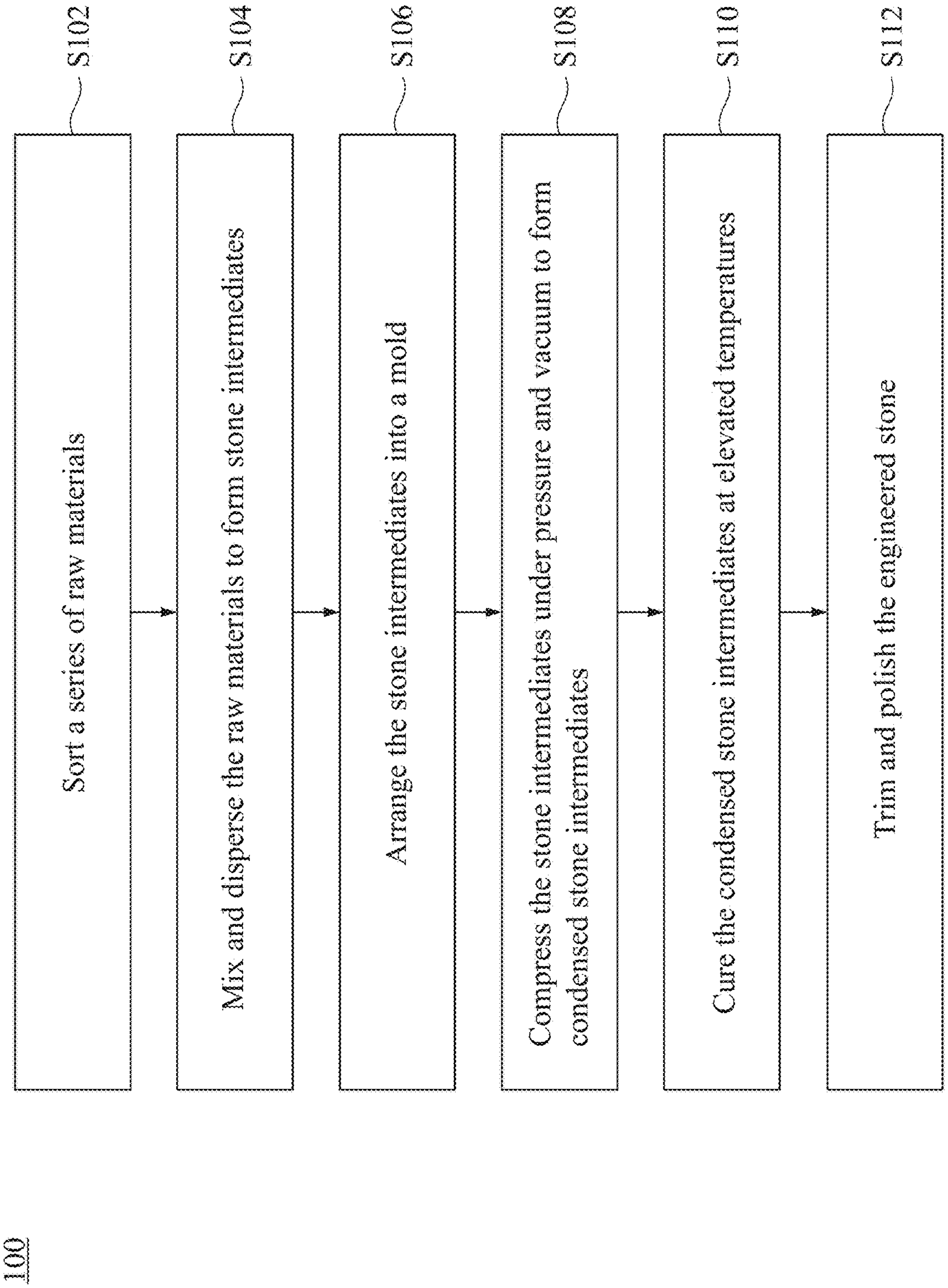
FIG. 1 is a flowchart of the method for manufacturing the engineered stone, in accordance with some embodiments.

Reference will now be made in detail to the present embodiments of the invention, examples of which are illustrated in the accompanying drawings. Wherever possible, the same reference numbers are used in the drawings and the description to refer to the same or like parts.

Although a series of operations or steps are used to illustrate the method of the present disclosure, the order shown in these operations or steps should not be construed as a limitation of the disclosure. For example, certain operations or steps may be performed in a different order and/or concurrently with other steps. Furthermore, not all illustrated operations, steps, and/or features must be performed to implement embodiments of the present disclosure, and each operation or step described herein may include several sub-steps or actions.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

FIG. 1 is a flowchart of the method 100 for manufacturing the engineered stone. Referring to FIG. 1, in step S102, a raw material is provided. The raw material includes 45.5-80% by weight of glass particle, 15.2-47% by weight of aluminium trihydrate (ATH), 6.5-18% by weight of resin, 0.07-0.28% by weight of curing agent, and 0.05-0.3% by weight of coupling agent.

In some embodiment, the 45.5-80% by weight of glass particle may include 5-30% by weight of glass particle with an average particle size of 0.2-0.6 mm, 30-55% by weight of glass particle with an average particle size of 0.1-0.2 mm, 10-30% by weight of glass particle with an average particle size of 0.038-0.052 mm, and 0.5-15% by weight of glass particle with an average particle size of 0.011-0.019 mm. In some embodiments, the glass particle may include silicon dioxide ($SiO_2$), sodium oxide ($Na_2O$) and calcium oxide (CaO). For example, the silicon dioxide ($SiO_2$) in the glass particle has an amorphous (non-crystalline) structure. In other words, the glass particle may be non-crystalline solid formed by rapid melt quenching. The glass particle has no periodic arrangement under microscopically. In some embodiments, the glass particle may also be glass powder. In some embodiments, the glass particle may be crushed/milled from untreated glass, for example, flat glass, motor vehicle glass, photovoltaic cover glass, etc.

In some embodiment, the 15.2-47% by weight of aluminium trihydrate (ATH, $AlOH_3$) may include 15-35% by weight of ATH with an average particle size of 0.012-0.018 mm, and 0.2-12% by weight of ATH with an average particle size of 0.005-0.012 mm. In some embodiment, the resin may include unsaturated polyester resin.

In some embodiment, the curing agent may include organic peroxide. In some embodiment, the curing agent may include tert-butyl peroxy-2-ethylhexanoate, butanone peroxide, tert-butyl perbenzoate or dibenzoyl peroxide.

In some embodiment, the coupling agent may include silane coupling agent. In some embodiments, the coupling agent may include 3-(trimethoxysilyl) propyl methacrylate, γ-(2,3-glycidoxy) propyltrimethoxysilane, N-β(amino-ethyl)-γ-Aminopropylmethyldimethoxysilane, N-(β-amino-ethyl)-γ-aminopropyltriethoxysilane, N-β (aminoethyl) γ-aminopropyltrimethoxysilane, Anilinomethyltriethoxysilane, γ-aminopropyltriethoxysilane, vinyltriethoxysilane, vinyltrimethoxysilane, or γ-chloropropyltriethoxysilane.

In some embodiment, the raw material may further include 0.05-0.3% by weight of polymeric coupling agent. For example, the polymeric coupling agent may include BYK-C8000. In some embodiment, the raw material may further include 0.05-0.45% by weight of wetting dispersing agent. For example, the wetting dispersing agent may include BYK-W908. In some embodiment, the raw material may further include 0.0002-0.8% by weight of pigment. For example, the pigment may include $TiO_2$ or $Fe_3O_4$.

Referring to FIG. 1, in step S104, the raw material is mixed and stirred to form a stone intermediate. In some embodiments, the raw material is added into a vessel of a high-speed dispersing mixer in sequence. In some embodiments, the raw material is mixed at 120-1200 revolution per minute (rpm) for 5-30 minutes.

Referring to FIG. 1, in step S106, the stone intermediate is arranged in a mold. The mold may be made of poly (methyl methacrylate (PMMA), polypropylene (PP), polyvinyl chloride (PVC), or stainless steel. In some embodiments, the thickness of the mold is in a range of 1 cm to 3 cm. For example, the mold is in a size of 23.5 cm*23.5 cm, and the mold is in a thickness of 2 cm. The stone intermediate is arranged in the presetting regions with proper amount, shape, size, and thickness. Then, the mold is removed.

Referring to FIG. 1, in step S108, the stone intermediate is compressed under high pressure and vacuum to form a compressed stone intermediate. In some embodiments, the stone intermediate is compressed in a vibrio-compaction machine. After the compressing process, the air in the stone intermediate can be released. In some embodiments, the stone intermediate is compressed by a pressure of 100-140 tons. In some embodiments, the stone intermediate is compressed under 0.65 kPa.

Referring to FIG. 1, in step S110, the compressed stone intermediate is cured in high temperature to form the engineered stone. In some embodiments, the compressed stone is placed in a heating/curing line. For example, the compressed stone intermediate is cured at 85° C. for 90 minutes until the compressed stone intermediate is fully hardened.

Referring to FIG. 1, in step S112, the engineered stone is trimmed and polished. In some embodiments, a cutting process is further performed to the engineered stone. In some embodiments, a flattening process is further performed to the engineered stone. In some embodiments, a polishing process is further performed to the engineered stone. For example the polishing process is a wet polishing process.

Figure 2:
FIG. 2 is a schematic diagram of the engineered stone, in accordance with some embodiments.

FIG. 2 is a schematic diagram of the engineered stone 200, in accordance with some embodiments. In the embodiment, seven groups of stone intermediates are included in the engineered stone 200. Hereinafter respectively referred to as stone intermediate A to stone intermediate F. The ingredients of the stone intermediate A-F are weighted to ensure the appropriate amount in the formulation.

The raw material of the stone intermediate A includes 448.0 g unsaturated polyester, 5.37 g coupling agent, 4.76 g polymeric coupling agent, 2.24 g wetting and dispersing agent, 22.4 g white pigment, 4.48 g curing agent, 352.0 g glass particle with an average particle size of 0.2-0.6 mm, 1244.0 g glass particle with an average particle size of 0.1-0.2 mm, and 784.0 g ATH with an average particle size of 0.012-0.018 mm. The stone intermediate A is prepared by following steps. First, 448.0 g unsaturated polyester is added into a vessel of a high-speed dispersing mixer and rotated in 500 rpm. Then, 5.37 g coupling agent, 4.76 g polymeric coupling agent, and 2.24 g wetting and dispersing agent are added into the unsaturated polyester. After 10 minutes, 22.4 g white pigment is slowly added and the speed is upgraded to 1200 rpm for about 30 minutes. Then, 4.48 g curing agent is added into the vessel, and the chemical materials are dispensed for 5 minutes. Second, 352.0 g glass particle with an average particle size of 0.2-0.6 mm, 1244.0 g glass particle with an average particle size of 0.1-0.2 mm, and 784.0 g ATH with an average particle size of 0.012-0.018 mm are added into another vessel and the stone aggregate materials are mixed for 15 minutes. Finally, the chemical materials and the stone aggregate materials are mixed at 120 rpm for 30 minutes.

The raw material of the stone intermediate B includes 254.0 g unsaturated polyester, 2.69 g coupling agent, 2.38 g polymeric coupling agent, 1.12 g wetting and dispersing agent, 0.078 g white pigment, 0.004 g black pigment, 2.24 g curing agent, 408.0 g glass particle with an average particle size of 0.1-0.2 mm, 267.0 g glass particle with an average particle size of 0.038-0.052 mm, 103.0 g glass particle with an average particle size of 0.011-0.019 mm and 382.0 g ATH with an average particle size of 0.012-0.018 mm. Then, the stone intermediate B is prepared according to the above steps.

The raw material of the stone intermediate C includes 241.0 g unsaturated polyester, 2.69 g coupling agent, 2.38 g polymeric coupling agent, 1.12 g wetting and dispersing agent, 0.034 g white pigment, 0.007 g black pigment, 2.24 g curing agent, 781.0 g glass particle with an average particle size of 0.1-0.2 mm, 382.0 g ATH with an average particle size of 0.012-0.018 mm, and 65.0 g ATH with an average particle size of 0.005-0.012 mm. Then, the stone intermediate C is prepared according to the above steps.

The raw material of the stone intermediate D includes 560.0 g unsaturated polyester, 236.0 g styrene, 6.5 g coupling agent, 0.12 g white pigment, 0.007 g black pigment, and 7.04 g curing agent. The raw material of the stone intermediate E includes 560.0 g unsaturated polyester, 236.0 g styrene, 6.5 g coupling agent, 0.053 g black pigment, and 7.04 g curing agent. The raw material of the stone intermediate F includes 36.0 g white pigment, and 14.0 g black pigment. The stone intermediate D, E and F are prepared according to the above steps.

Then, the stone intermediates A-F are arranged into a mold made of PP. The stone intermediates A-F are arranged into the presetting region of the mold to meet particular vein design of the engineered stone 200. Next, the mold is removed and the stone intermediates A-F are compressed to form a form a condensed stone intermediate. Finally, the condensed stone intermediate is cured in high temperature to form the engineered stone 200.

Figure 3:
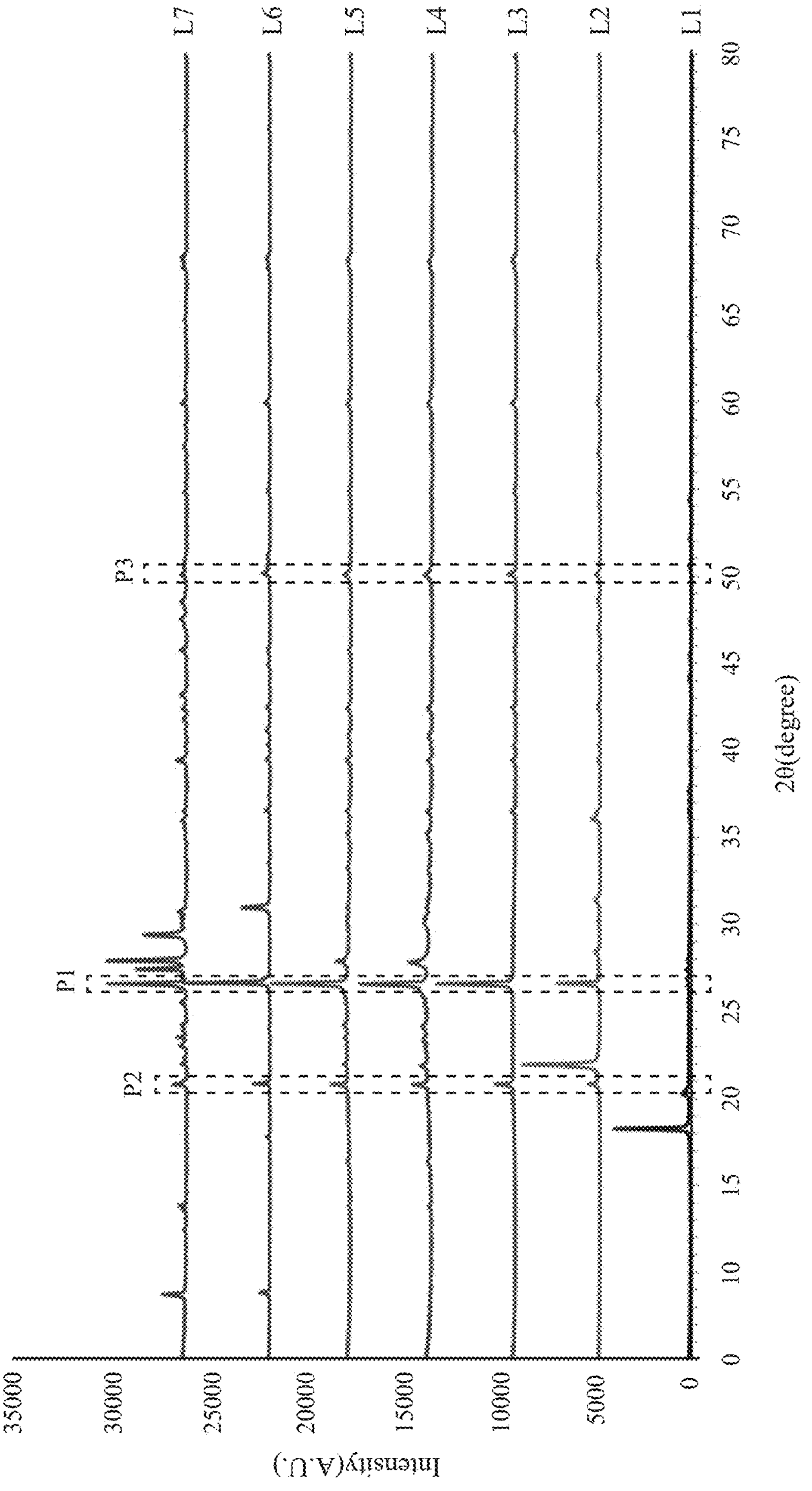
FIG. 3 is a spectrum chart of crystalline silica intensity of the embodiment of the present disclosure and comparison groups, in accordance with some embodiments.

FIG. 3 is a spectrum chart of crystalline silica intensity of the embodiment of the present disclosure and comparison groups, in accordance with some embodiments. The test for the crystalline silica intensity is performed by a testing method according to NIOSH 7500. As shown in FIGS. 3, P1, P2, and P3 indicate the signal of crystalline silica. In FIG. 3, L1 indicates crystalline silica intensity of the embodiment of the present disclosure, and L2-L7 indicate crystalline silica intensity of the comparison groups. L2, L3, L4, L5, L6, and L7 indicate crystalline silica intensity of regular artificial quartz, low silica formula artificial quartz, artificial sintered stone, artificial porcelain, natural marble, natural quartzite (granite), respectively. As shown in the L1 of FIG. 3, the engineered stone 200 of the present disclosure contains almost no crystalline silica.

Regarding the crystallinity percentage and amorphous percentage of the embodiment of the present disclosure and comparison groups, please refer to Table 1 below. As shown in Table 1, the crystallinity percentage of the embodiment of the present disclosure is 46.00%, and the crystalline structures include Gibbsite ($Al(OH)_3$), and Rutile ($Ti_{0.928}O_2$). The amorphous percentage of the embodiment of the present disclosure is 54.00%. As shown in Table 1, there is no crystalline silicon in the crystalline structures of the embodiment of the present disclosure. Combining the composition of the embodiment with Table 1, it can be seen that the silicon dioxide ($SiO_2$) in the embodiment has an amorphous (non-crystalline) structure. Moreover, the crystalline structures in the comparison groups all include crystalline silica (quartz).

TABLE 1

| Item | Crystalline structure | | Crystallinity percentage | Amorphous percentage |
|---|---|---|---|---|
| quartzite (L7) | Quartz, $SiO_2$ | 44.95% | 82.90% | 17.10% |
| | Calcium carbonate, $CaCO_3$ | 16.68% | | |
| | Albite, $(Na, Ca)Al(SiAl)_3O_8$ | 15.94% | | |
| | Gibbsite, $Al(OH)_3$ | 1.17% | | |
| | Muscovite, $KAl_3Si_3O_{10}(OH)_2$ | 4.16% | | |
| marble (L6) | Quartz, $SiO_2$ | 52.42% | 84.00% | 16.00% |
| | Dolomite, $MgCa(CO_3)_2$ | 16.12% | | |
| | Muscovite, $Na(AlSi_3O_8)$ | 15.46% | | |
| porcelain (L5) | Quartz, $SiO_2$ | 26.71% | 45.20% | 54.80% |
| | Mullite, $Al_{4.75}Si_{1.25}O_{9.63}$ | 6.87% | | |
| | Albite, $Na(AlSi_3O_8)$ | 11.62% | | |
| sintered stone (L4) | Quartz, $SiO_2$ | 20.4% | 45.3% | 54.7% |
| | Albite, $NaAl(SiAl)_3O_8$ | 14.13% | | |
| | Mullite, $Al_{4.59}Si_{1.41}O_{9.7}$ | 8.24% | | |
| | Tridymite, $SiO_2$ | 2.53% | | |
| low silica formula quartz (L3) | Quartz, $SiO_2$ | 43.90% | 43.90% | 56.10% |
| regular quartz (L2) | Quartz, $SiO_2$ | 12.97% | 78.60% | 21.40% |
| | Cristobalite, $SiO_2$ | 65.63% | | |
| engineered stone (L1) | Gibbsite, $Al(OH)_3$ | 42.96% | 46.00% | 54.00% |
| | Rutile, $Ti_{0.928}O_2$ | 3.04% | | |

As shown in FIG. 3 and Table 1, the engineered stone of the present disclosure is crystalline silica free. Since the engineered stone of the present disclosure does not contain crystalline silica, it can reduce the possibility of technicians suffering from silicosis.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An engineered stone, comprising:

5-30% by weight of glass particle with an average particle size of 0.6 mm, 30-55% by weight of glass particle with an average particle size of 0.1-0.2 mm, 10-30% by weight of glass particle with an average particle size of 0.038-0.052 mm, 0.5-15% by weight of glass particle with an average particle size of 0.011-0.019 mm, 15.2-47% by weight of aluminium trihydrate (ATH), 6.5-18% by weight of resin, 0.07-0.28% by weight of curing agent, and 0.05-0.3% by weight of coupling agent.

2. The engineered stone of claim 1, further comprising:

0.05-0.3% by weight of polymeric coupling agent.

3. The engineered stone of claim 1, further comprising:

0.05-0.45% by weight of wetting dispersing agent.

4. The engineered stone of claim 1, further comprising:

0.0002-0.8% by weight of pigment.

5. The engineered stone of claim 1, wherein the ATH comprises:

15-35% by weight of ATH with an average particle size of 0.012-0.018 mm; and 0.2-12% by weight of ATH with an average particle size of 0.005-0.012 mm.

6. A manufacturing method of an engineered stone, comprising:

providing a raw material, wherein the raw material comprises 5-30% by weight of glass particle with an average particle size of 0.6 mm, 30-55% by weight of glass particle with an average particle size of 0.1-0.2 mm, 10-30% by weight of glass particle with an average particle size of 0.038-0.052 mm, 0.5-15% by weight of glass particle with an average particle size of 0.011-0.019 mm, 15.2-47% by weight of aluminium trihydrate (ATH), 6.5-18% by weight of resin, 0.07-0.28% by weight of curing agent, and 0.05-0.3% by weight of coupling agent;

mixing and stirring the raw material to form a stone intermediate;

arranging the stone intermediate in a mold;

removing the mold;

compressing the stone intermediate under high pressure and vacuum to form a condensed stone intermediate, wherein a air in the stone intermediate is released; and curing the condensed stone intermediate at elevated temperature to form the engineered stone.

7. The method of claim 6, wherein after curing further comprises:

performing a cutting process to the engineered stone;

performing a flattening process to the engineered stone; and performing a polishing process to the engineered stone.

8. The method of claim 6, wherein the resin comprises unsaturated polyester.

9. The method of claim 6, wherein the curing agent comprises tert-butyl peroxy-2-ethylhexanoate.

10. The method of claim 6, wherein the coupling agent comprises 3-(trimethoxysilyl) propyl methacrylate.

11. The method of claim 6, wherein the stone intermediate is compressed by a pressure of 100-140 tons.

12. The method of claim 6, wherein the stone intermediate is compressed under 0.65 kPa.

13. The method of claim 6, wherein the compressed stone intermediate is cured at 85° C. for 90 minutes.

14. The method of claim 6, wherein the mold is made of poly(methyl methacrylate (PMMA), polypropylene (PP), polyvinyl chloride (PVC), or stainless steel.

* * * * *